(12) United States Patent
Poirot et al.

(10) Patent No.: US 10,718,480 B2
(45) Date of Patent: Jul. 21, 2020

(54) LIGHT DEVICE COMPRISING A SURFACE LIGHT SOURCE

(71) Applicant: VALEO VISION, Bobigny (FR)

(72) Inventors: Pascal Poirot, Bobigny (FR); Babacar Bathiery, Bobigny (FR)

(73) Assignee: VALEO VISION, Bobigny (FR)

( * ) Notice: Subject to any disclaimer, the term of this patent is extended or adjusted under 35 U.S.C. 154(b) by 147 days.

(21) Appl. No.: 15/711,496

(22) Filed: Sep. 21, 2017

(65) Prior Publication Data
US 2018/0080619 A1 Mar. 22, 2018

(30) Foreign Application Priority Data

Sep. 21, 2016 (FR) ...................... 16 58886

(51) Int. Cl.
| | | |
|---|---|---|
| *F21S 41/141* | (2018.01) | |
| *F21S 41/29* | (2018.01) | |
| *F21S 41/19* | (2018.01) | |
| *F21S 43/19* | (2018.01) | |
| *F21S 45/00* | (2018.01) | |
| *F21S 41/20* | (2018.01) | |
| *B60Q 3/74* | (2017.01) | |

(Continued)

(52) U.S. Cl.
CPC .......... *F21S 41/141* (2018.01); *B60Q 1/2615* (2013.01); *B60Q 3/745* (2017.02); *F21K 9/237* (2016.08); *F21K 9/90* (2013.01); *F21S 41/155* (2018.01); *F21S 41/19* (2018.01); *F21S 41/29* (2018.01); *F21S 43/145* (2018.01); *F21S 43/19* (2018.01); *F21S 43/27* (2018.01); *F21S 45/00* (2018.01); *B60Q 2400/10* (2013.01); *B60Q 2500/10* (2013.01); *F21S 41/285* (2018.01); *F21S 43/255* (2018.01); *F21S 43/26* (2018.01)

(58) Field of Classification Search
CPC ...................................................... F21S 41/141
See application file for complete search history.

(56) References Cited

U.S. PATENT DOCUMENTS

| | | | | |
|---|---|---|---|---|
| 6,520,669 | B1 * | 2/2003 | Chen ..................... | F21S 41/143 362/545 |
| 2001/0053082 | A1 | 12/2001 | Chipalkatti et al. | |

(Continued)

FOREIGN PATENT DOCUMENTS

| | | |
|---|---|---|
| DE | 202 07 799 U1 | 8/2002 |
| DE | 10 2005 024 8 | 11/2006 |

(Continued)

OTHER PUBLICATIONS

French Preliminary Search Report dated May 18, 2017 in French Application 16 58886, filed on Sep. 21, 2016 (with English Translation of Categories of cited documents).

*Primary Examiner* — Thien M Le
*Assistant Examiner* — Asifa Habib
(74) *Attorney, Agent, or Firm* — Oblon, McClelland, Maier & Neustadt, L.L.P.

(57) ABSTRACT

A light device for a motor vehicle lighting and/or signaling device includes a flexible surface light source a housing arranged to conform at least a part of the flexible surface light source according to a predetermined form a cap arranged to press said part of the flexible surface light source against the housing the housing and/or the cap being capable of allowing light emitted by the flexible surface light source to pass.

14 Claims, 2 Drawing Sheets

(51) Int. Cl.
*F21S 43/27* (2018.01)
*F21S 43/145* (2018.01)
*F21S 41/155* (2018.01)
*B60Q 1/26* (2006.01)
*F21K 9/237* (2016.01)
*F21K 9/90* (2016.01)
*F21S 43/20* (2018.01)

(56) References Cited

U.S. PATENT DOCUMENTS

| | | | | |
|---|---|---|---|---|
| 2004/0213009 A1* | 10/2004 | Yagi | ............. | B60Q 1/2665 362/494 |
| 2008/0018244 A1* | 1/2008 | Anandan | ............. | H01L 51/5243 313/511 |
| 2010/0195345 A1* | 8/2010 | Sugie | ............. | F21S 41/148 362/516 |
| 2012/0170296 A1* | 7/2012 | Ostrowski | ............. | F21S 43/13 362/519 |
| 2013/0329438 A1 | 12/2013 | Wakahara et al. | | |
| 2014/0210374 A1* | 7/2014 | Schoel | ............. | H05B 45/10 315/297 |
| 2014/0268746 A1* | 9/2014 | Paine | ............. | B60Q 1/05 362/235 |
| 2014/0334175 A1* | 11/2014 | Jha | ............. | F21S 41/141 362/520 |
| 2015/0377456 A1 | 12/2015 | Onishi et al. | | |
| 2016/0290586 A1 | 10/2016 | Shido et al. | | |
| 2016/0372689 A1* | 12/2016 | Hao | ............. | H01L 51/52 |
| 2016/0377251 A1* | 12/2016 | Kim | ............. | G06K 9/00791 362/466 |

FOREIGN PATENT DOCUMENTS

| | | |
|---|---|---|
| DE | 2 921 349 A1 | 12/2015 |
| DE | 10 2015 109 663 A1 | 12/2015 |
| EP | 1 110 816 A2 | 6/2001 |
| EP | 2 565 532 A2 | 3/2013 |
| EP | 2 679 893 A1 | 1/2014 |
| EP | 2 712 765 A1 | 4/2014 |
| WO | WO 2015/098822 A1 | 7/2015 |

* cited by examiner

LIGHT DEVICE COMPRISING A SURFACE LIGHT SOURCE

The invention relates to the field of lighting and/or signaling, particularly for motor vehicles. More particularly, the invention relates to a light device for a motor vehicle lighting and/or signaling device.

In motor vehicles, flexible organic light-emitting diodes (OLEDs) are being used increasingly widely. In effect, the flexible OLEDs offer numerous possibilities of forms and of style, thus contributing to the esthetic appeal of the vehicle and to a specific visual signature.

Furthermore, the flexible OLEDs also make it possible to emit light from an emission surface and thus obtain a uniform visual rendering of this emission surface regardless of the direction of observation. The vehicle is then more visible, which increases safety as well as the esthetic appearance of the vehicle.

However, because of their flexibility, it is necessary to maintain the form of these flexible OLEDs in order to be able to incorporate them in a light device of the vehicle.

The document FR3018393 discloses a method for conforming a flexible OLED by molding a resin on this flexible OLED. However, this forming method presents a risk of damage to the flexible OLED. Moreover, this method imposes a manufacturing method that is complex, lengthy and expensive. There is therefore a need to conform and maintain the form of a flexible OLED simply, rapidly and inexpensively, without damaging it.

One aim of the invention is thus to meet this need.

To this end, the invention proposes a light device for a motor vehicle lighting and/or signaling device comprising:
- a flexible surface light source
- a housing arranged to conform at least a part of the flexible surface light source according to a predetermined form
- a cap arranged to press said part of the flexible surface light source against the housing the housing and/or the cap being capable of allowing light emitted by the flexible surface light source to pass.

Thus, by virtue of the present invention, the flexible OLED can be conformed without being damaged since a resin is not molded on this flexible OLED. Furthermore, the use of a housing and of a cap makes it possible to conform and maintain the form of the flexible OLED very simply, very rapidly and inexpensively.

Advantageously, the invention can be implemented in a road lighting device, a vehicle signaling device or even in a vehicle interior lighting device.

A surface light source should be understood to be a source having a light-emitting surface and in which the dimensions of the light-emitting surface are substantially greater than the height of the surface source, for example with an area greater than 1 cm$^2$, even greater than 10 cm$^2$.

A flexible light source should be understood to be a light source that can be deformed without breaking, particularly by folding it or by bending it, and without substantially altering the light emission function.

Advantageously, said part of the flexible surface light source comprises a light-emitting surface of said flexible surface light source.

Preferably, all of the flexible surface light source is conformed according to a predetermined form.

Hereinafter in the description, it will be considered, that the cap is capable of allowing light to pass. It would alternatively or cumulatively be possible to consider that it is the housing which is capable of allowing the light to pass without departing from the scope of the present invention.

According to one embodiment, the cap is integrally formed with the housing. If necessary, the housing and the cap can be arranged to form a cavity emerging on a slit through which said part of the flexible surface light source can be inserted into the cavity.

According to another embodiment, the housing and the cap are two distinct elements.

For example, the device comprises a link means, and in particular a hinge, linking the cap and the housing and arranged so that the cap is mobile with respect to the housing to allow the insertion of the flexible surface light source between the housing and the cap.

As a variant, the housing and the cap are arranged to come into contact so as to encapsulate the flexible surface light source, in particular all of the flexible surface light source. "Encapsulate" should be understood to mean that the contact between the housing and the cap is arranged to form a tight capsule, in particular tight to moisture. The encapsulation of the flexible surface light source makes it possible to prevent the deterioration of this flexible surface light source which would be caused by the ingress of a disturbing element between the cap and the flexible surface light source, for example, the ingress of moisture.

Advantageously, the flexible surface light source rests on a bottom wall of the housing and the flexible surface light source is pressed by a pressing wall of the cap onto the bottom wall of the housing.

For example, the housing comprises a peripheral flange extending from the bottom wall of the housing, in particular from the perimeter of the bottom wall, and defining an enclosure for receiving the flexible surface light source. If necessary, at least a part of the cap rests on said peripheral flange of the housing to encapsulate the enclosure. In a variant, said peripheral flange of the housing protrudes relative to the emitting surface of the flexible surface light source when said flexible surface light source rests on the bottom wall. In another variant, said peripheral flange of the housing is flush with the emitting surface of the flexible surface light source when said flexible surface light source rests on the bottom wall.

Advantageously, at least a part of the cap, defining the pressing wall of the cap, is inserted into the enclosure to press the flexible surface light source against the bottom wall of the housing. In a variant, a peripheral zone of the cap rests on the peripheral flange of the housing whereas a central zone of the cap, protruding relative to the peripheral zone and defining the pressing wall of the cap, is inserted into the enclosure. In another variant, all of the cap is inserted into the enclosure to press the flexible surface light source.

Advantageously, the cap comprises a peripheral flange extending from the pressing wall of the cap and defining an enclosure for receiving the flexible surface light source. Preferably, the peripheral flange of the cap rests on a part of the housing, in particular a peripheral zone of the housing surrounding the bottom wall. Advantageously, at least a part of the housing, said part defining the bottom wall of the housing, is inserted into the enclosure formed by the peripheral flange of the cap. In a variant, all of the housing is inserted into the enclosure.

Advantageously, the housing and the cap are welded together. If necessary, the peripheral flange of one of the housing and/or of the cap can be welded to the peripheral zone of the other of the housing and/or of the cap. As a variant, the housing and/or the cap being inserted into the enclosure defined by the peripheral flange of the other of the housing and/or of the cap, a peripheral outer wall of the housing and/or of the cap is in contact with a peripheral inner wall of the other of the housing and/or of the cap. If necessary, a part of the peripheral outer wall is welded to a part of the peripheral inner wall. The welding can notably be done using a laser.

In a variant, the housing and the cap are glued together.

In another variant, the housing and the cap are fixed to one another by a mechanical fixing means. Advantageously, the cap comprises a male snap-fitting means, notably a clip, and the housing comprises a female snap-fitting means, notably a notch, cooperating with the male snap-fitting means when the cap and the housing are brought into contact to form the mechanical fixing means.

Preferably, the flexible surface light source comprises a light-emission surface greater than 1 cm$^2$, even greater than 10 cm$^2$. Preferentially, the flexible surface light source is a flexible organic light-emitting diode.

Advantageously, at least the pressing wall of the cap is produced in a transparent or translucent material which allows light emitted by the flexible surface light source to pass.

Advantageously, at least the pressing wall of the cap is produced in a material capable of coloring the light emitted by the flexible surface light source. The emission of colored light makes it possible to enhance and differentiate the esthetic appearance of the vehicle when the light source is activated and also to produce predetermined regulatory photometric functions requiring a particular color.

Advantageously, at least the pressing wall of the cap is produced in a transparent thermoplastic material.

Advantageously, the transparent thermoplastic material is polymethyl methacrylate (PMMA) or polycarbonate (PC).

Advantageously, at least the pressing wall of the cap comprises holes capable of allowing light to pass. If necessary, it will be possible to provide for the cap to be opaque rather than transparent or translucent, for example being formed by a perforated aluminum plate.

Advantageously, at least a part of the pressing wall of the cap is screen-printed. If necessary, this screen-printing allows for the display of a symbol or of a logo, when light is emitted by the flexible surface light source, and/or in the absence of light emission by the surface light source.

Advantageously, at least a part of the pressing wall of the cap is arranged to deflect at least a part of the light emitted by the flexible surface source to produce a predetermined photometric function. For example, at least said part of the pressing wall of the cap comprises diffusing optical patterns such as hollowing or graining patterns.

Advantageously, the device comprises locking means capable of cooperating with complementary locking means of the flexible surface light source, in particular formed on the perimeter of this flexible surface light source, to eliminate the play of said flexible surface light source in the housing. For example, the cap and/or the housing comprises protruding elements forming said locking means and the flexible surface light source comprises notches forming said complementary locking means.

Advantageously, the housing is produced in an opaque and/or reflecting material.

In a variant, the housing is produced in a transparent material.

Advantageously, the housing is produced in a thermoplastic material.

In a variant, the predetermined form is a three-dimensional surface. "Three-dimensional surface" should be understood to mean a surface curved in at least one given direction, that is to say that three Cartesian coordinates are necessary to define each of the points of the surface and do so regardless of the reference frame selected. Advantageously, the predetermined form is a controlled surface.

Advantageously, the housing and the cap exhibit identical profiles, which makes it possible to more easily conform the flexible surface light source over all of its surface.

Advantageously, the light device has no adhesive in the enclosure formed by the housing and the cap. In this way, the imposition of a significant mechanical stress on the flexible surface light source is avoided.

Advantageously, the light device comprises fixing means for fixing the device in the lighting or signaling device. If necessary, the housing and/or the cap comprises the fixing means.

Other features and advantages of the present invention will become more clearly apparent from the description and the drawings in which:

FIG. 2b is a theoretical diagram viewed according to the plane P2 of the light device presented in FIG. 2a;

Figure 1:
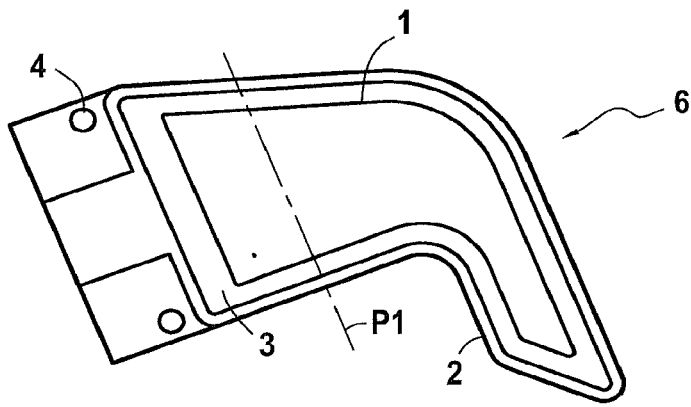
FIG. 1 is a representation of a light device according to the invention.

FIG. 1 represents a light device 6 according to the invention for a motor vehicle lighting and/or signaling or interior lighting device. The light device 6 comprises a flexible OLED 1, a housing 2 and a cap 3.

An exemplary embodiment of such a source will be presented below in FIG. 5. The housing 2 makes it possible to conform the flexible OLED 1 by bending it in a direction to form a controlled surface. The cap 3 makes it possible to press the flexible OLED 1 against the housing 2.

The housing 2 also comprises fixing means 4, produced in this example in the form of orifices intended to receive screws, for fixing the light device 6 into the lighting or signaling device.

Figure 2A:
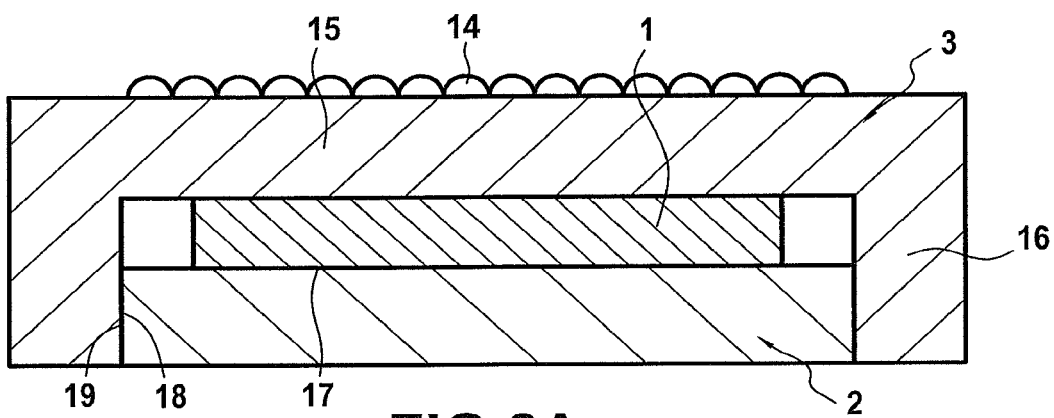
FIG. 2a is a theoretical diagram viewed according to the plane P1 of a light device according to the invention according to a first embodiment.
Figure 2B:
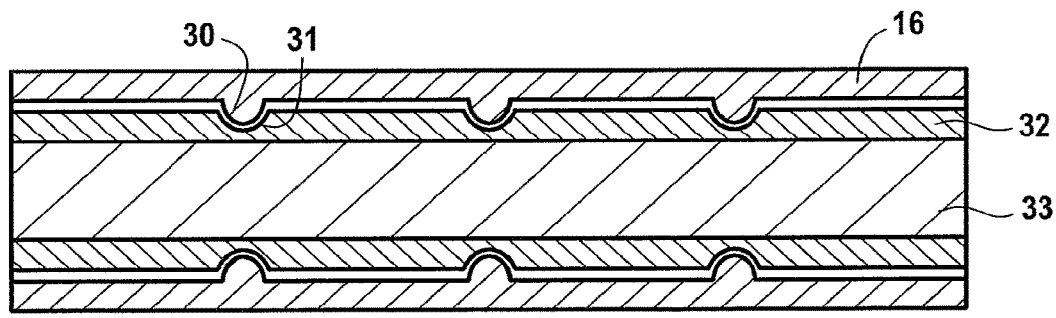

FIGS. 2A and 2B respectively represent cross-sectional views according to the planes P1 and P2 of the device 6 of FIG. 1.

The flexible OLED 1 rests on a bottom wall 17 of the housing 2 and said flexible OLED 1 is pressed by a pressing wall 15 of the cap 3 onto the bottom wall 17 of the housing 2. The flexible OLED 1 is thus conformed according to a predetermined form by the housing 2 and kept in this form by the cap 3. The housing 2 and the cap 3 exhibit identical profiles. Furthermore, the housing 2 and the cap 3 encapsulate all of the flexible OLED 1. The flexible OLED 1 is thus protected from external attack and in particular from moisture, which avoids premature deterioration of the flexible OLED 1.

The cap 3 comprises a peripheral flange 16 extending from the pressing wall 15 and defining an enclosure for receiving the flexible OLED 1.

All of the housing 2 is inserted into the enclosure formed by the peripheral flange 16 of the cap 3. The housing 2 comprises a peripheral outer wall 18 and the cap 3 comprises a peripheral inner wall 19, two portions of these peripheral walls 18 and 19 coming into contact upon the insertion of the housing 2 into the cap 3. The peripheral outer wall 18 of the housing 2 is welded with the peripheral inner wall 19 of the cap 3 at these portions coming into contact.

In the embodiment represented, the flexible OLED 1 has two, top and bottom light-emitting surfaces 33. The pressing wall 15 of the cap 3 is produced in a transparent material allowing light emitted by the top emitting surface 33 of the flexible OLED 1 to pass. This transparent material is polymethyl methacrylate. The pressing wall 15 of the cap 3 comprises optical patterns 14, produced by a graining of the top face of the cap 3, making it possible to diffuse the light from the top emitting surface 33 of the flexible OLED 1 and to give a uniform appearance to the light leaving the light device.

The housing 2 is produced in a reflecting material, so as to reflect light emitted by the bottom emitting surface 33 of the flexible OLED 1 in this flexible OLED toward the top emitting face and therefore toward the pressing wall 15 of the cap 3. The peripheral flange of the cap 3 comprises convex protruding elements 30. The flexible OLED 1 has a functional zone 32, intended in particular for its electrical power supply, edging the emitting surfaces 33 of this flexible OLED 1. The flexible OLED 1 further comprises concave notches 31, produced on the perimeter of the functional zone 32. The notches 31 exhibit a profile identical to that of the protruding elements 30, these protruding elements 30 being aligned with and inserted into the notches 31 of the flexible OLED 1 when the flexible OLED 1 is encapsulated by the cap 3 and the housing 2. These protruding elements 30 and these notches 31 thus form locking means and complementary locking means for eliminating the play of the flexible OLED 1, defined between the perimeter of the functional zone 32 and the peripheral flange 16 of the cap 3, when the OLED is encapsulated by the cap 3 and the housing 2.

Figure 3:
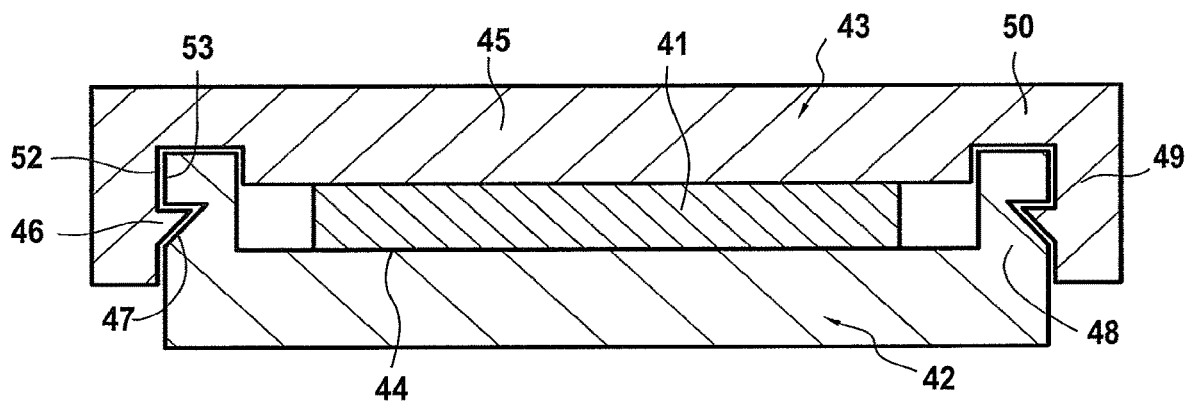
FIG. 3 is a theoretical diagram viewed according to a transverse cross section of a light device according to the invention according to a second embodiment.

A second embodiment of the light device is presented, according to a transverse cross-sectional view in FIG. 3.

A flexible OLED 41 rests on the bottom wall 44 of housing 42 and the flexible OLED 41 is pressed by a pressing wall 45 of a cap 43 onto the bottom wall 44 of the housing 42.

The housing 42 comprises a peripheral flange 48 extending from the bottom wall 44 of the housing 42 and forming an enclosure receiving the flexible OLED 41. Said peripheral flange 48 of the housing 42 protrudes relative to the emitting surface of the flexible OLED 41. The pressing wall 45 of the cap 43 is inserted into the enclosure to press the flexible OLED 41 against the bottom wall 44 of the housing 42 and a peripheral zone 50 of the cap 43 rests on the peripheral flange 48 of the housing 42.

The cap 43 comprises a peripheral flange 49 extending from the peripheral zone 50 of the cap 43, such that the peripheral zone 50 forms an indentation between the peripheral flange 49 and the pressing wall 45, this indentation receiving the peripheral flange 48 of the housing 42.

The peripheral flange 49 of the cap 43 comprises a peripheral inner wall 52 and the peripheral flange 48 of the housing 42 comprises a peripheral outer wall 53, two portions of these peripheral walls 52 and 53 coming into contact upon the insertion of the pressing wall 45 of the cap 43 into the enclosure of the housing 42. The peripheral inner wall 52 of the cap 43 comprises a clip 46 and the peripheral outer wall 53 of the housing 42 comprises a notch 47. The clip 46 and the notch 47 are fitted together elastically to fix the housing 42 and the cap 43 to one another. The housing 42 and the cap 43 thus come to encapsulate the flexible OLED 41.

The flexible OLED 41 is thus conformed according to a predetermined form by the housing 42 and kept in this form by the cap 43 simply, rapidly and inexpensively.

Figure 4:
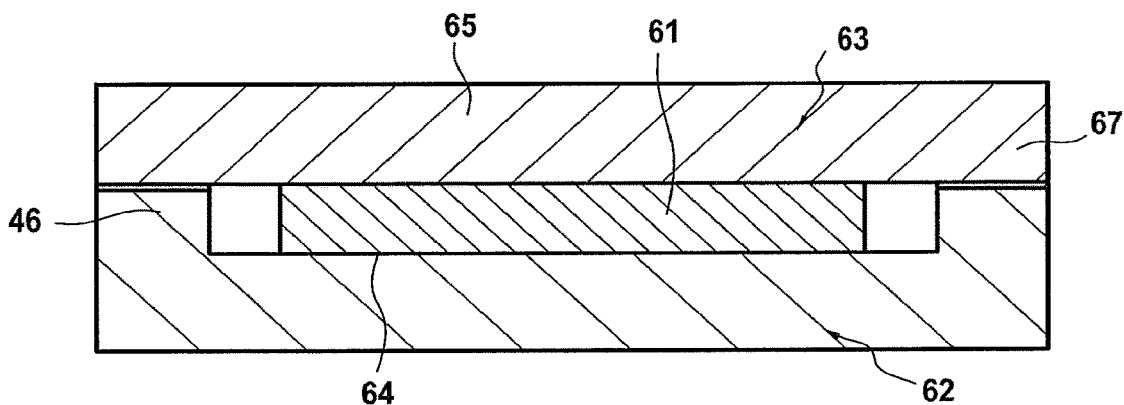
FIG. 4 is a theoretical diagram viewed according to a transverse cross section of a light device according to the invention according to a third embodiment.

Another embodiment of a light device according to the invention is presented in FIG. 4 showing a transverse cross-sectional view of such a device.

A flexible OLED 61 rests on a bottom wall 64 of a housing 62 and the flexible OLED 61 is pressed by a pressing wall 65 of a cap 63 onto the bottom wall 64 of the housing 62.

The housing 62 comprises a peripheral flange 66 extending from the perimeter of the bottom wall 64 of the housing 62 and defining an enclosure receiving the flexible OLED 61. The peripheral flange 66 of the housing 62 is flush with the emitting surface of the flexible OLED 61.

A peripheral zone 67 of the cap 63 rests on said peripheral flange 66 of the housing 62. Also, the peripheral flange 66 of the housing 62 is welded to the peripheral zone 67 of the cap 63 which comes into contact with the peripheral flange 66 of the housing 62 when the cap 63 is put in place to encapsulate the enclosure.

The housing 62 and the cap 63 thus come to encapsulate the flexible OLED 61.

Figure 5:
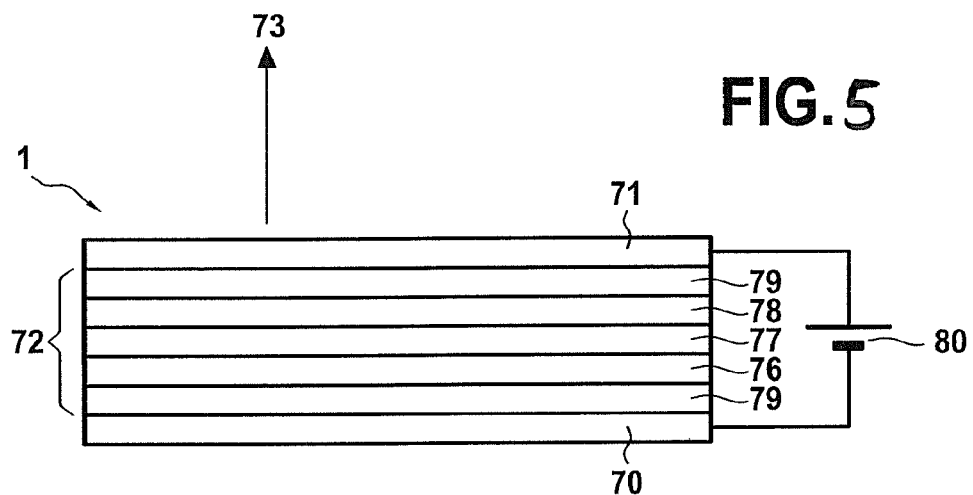
FIG. 5 is a theoretical diagram of an embodiment of a flexible surface light source that can be used for the implementation of a lighting and/or signaling device according to the invention.

FIG. 5 presents a flexible OLED in accordance with that used in the embodiments already presented in FIGS. 1, 2A and 2B, and which could be used as such in the embodiments described in FIGS. 3 and 4.

The flexible OLED 1 comprises several layers: a cathode 70, an anode 71 and an organic layer 72. The organic layer 72 comprises various plies 75 to 79 produced in different organic materials. In addition to the light-emitting ply 77, the organic layer comprises a ply 75 promoting the transfer of the electrons to the emitting ply 77 and a ply 79 promoting the transfer of the holes to the emitting ply 77. The layer also comprises a ply 76 locking the holes coming from the upper layers 77 to 79 and a ply 78 locking the electrons originating from the lower plies 75 to 77. Together, these plies constitute a microcavity whose thickness is adjusted to create an optical resonance. Thus, selective interferential reflectors are produced constituting resonant cavities.

The light-emitting ply 77 comprises a top emitting surface 33 and a bottom emitting surface 33.

An electric voltage generator or an electric current source 80 makes it possible to power the flexible OLED 1.

When the organic layer is passed through by an electric current, the top emitting surface 33 emits a light radiation 73 that is propagated through the upper plies 78 and 79 and the anode 71 which are transparent to this radiation and the bottom emitting surface 33 emits a light radiation that is propagated through the lower plies 76 and 75 and the cathode 70 which are transparent to this radiation.

The anode 71 and the cathode 70 are produced in transparent indium-tin oxide (ITO).

The invention claimed is:

1. A light device for a motor vehicle lighting and/or signaling device comprising:
   a flexible surface light source;
   a housing arranged to conform at least a part of the flexible surface light source according to a predetermined form; and
   a cap arranged to press said part of the flexible surface light source against the housing, wherein the housing and/or the cap being configured to allow light emitted by the flexible surface light source to pass, wherein the housing includes a peripheral flange extending from a bottom wall of the housing and defining an enclosure for receiving the flexible surface light source, and wherein the cap includes a peripheral flange configured to interlock with the peripheral flange of the housing.

2. The light device according to claim 1, wherein the device comprises a hinge linking the cap and the housing arranged so that the cap is mobile with respect to the housing to allow the insertion of the flexible surface light source between the housing and the cap.

3. The light device according to claim 1, wherein the housing and the cap are two distinct elements.

4. The light device according to claim 3, wherein the housing and the cap are arranged to come into contact so as to encapsulate the flexible surface light source.

5. The light device according to claim 4, wherein the flexible surface light source rests on the bottom wall of the housing and in that the flexible surface light source is pressed by a pressing wall of the cap onto the bottom wall of the housing.

6. The light device according to claim 5, wherein at least a part of the cap rests on said peripheral flange of the housing to encapsulate the enclosure.

7. The light device according to claim 6, wherein at least a part of the cap, defining the pressing wall of the cap, is inserted into the enclosure to press the flexible surface light source against the bottom wall of the housing.

8. The light device according to claim 5, wherein at least a part of the cap, defining the pressing wall of the cap, is inserted into the enclosure to press the flexible surface light source against the bottom wall of the housing.

9. The light device according to claim 5, wherein at least the pressing wall of the cap is produced in a transparent or translucent material.

10. The light device according to claim 5, wherein at least the pressing wall of the cap is produced in a material configured to color the light emitted by the flexible surface light source.

11. The light device according to claim 5, wherein at least a part of the pressing wall of the cap is arranged to deflect at least a part of the light emitted by the flexible surface source to produce a predetermined photometric function.

12. The light device according to claim 1, wherein the flexible surface light source is an organic light-emitting diode.

13. The light device according to claim 1, further comprising locking means configured to cooperate with complementary locking means of the flexible surface light source to eliminate the play of said flexible surface light source in the housing.

14. The light device according to claim 1, the housing is arranged to conform at least the part of the flexible surface light source according to the predetermined form without resin.

* * * * *